United States Patent
Gupta et al.

(10) Patent No.: US 11,194,913 B2
(45) Date of Patent: Dec. 7, 2021

(54) UNSECURE TO SECURE TRANSITION OF MUTABLE CORE ROOT OF TRUST

(71) Applicant: International Business Machines Corporation, Armonk, NY (US)

(72) Inventors: Sachin Gupta, Bangalore (IN); Sandeep Korrapati, Bangalore (IN); Santosh Balasubramanian, Bangalore (IN); Raja Das, Bengaluru (IN); Shakeeb Pasha B.K., Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 16/299,855

(22) Filed: Mar. 12, 2019

(65) Prior Publication Data

US 2020/0293662 A1 Sep. 17, 2020

(51) Int. Cl.
  *G06F 21/57* (2013.01)
  *G06F 8/654* (2018.01)
  *G06F 21/12* (2013.01)
  *G06F 21/51* (2013.01)

(52) U.S. Cl.
  CPC ............ *G06F 21/575* (2013.01); *G06F 8/654* (2018.02); *G06F 21/123* (2013.01); *G06F 21/51* (2013.01); *G06F 21/572* (2013.01)

(58) Field of Classification Search
  CPC ........ G06F 21/575; G06F 21/57; G06F 21/51; G06F 21/572; G06F 21/215; G06F 8/654
  See application file for complete search history.

(56) References Cited

U.S. PATENT DOCUMENTS

| 8,245,053 | B2 | 8/2012 | Hoang et al. | |
|---|---|---|---|---|
| 9,823,934 | B2 | 11/2017 | Marr et al. | |
| 2001/0041831 | A1* | 11/2001 | Starkweather | A61M 5/168 600/365 |
| 2005/0204155 | A1* | 9/2005 | Ravi | G06F 21/85 726/22 |
| 2011/0131403 | A1* | 6/2011 | Ibrahim | G06F 21/572 713/2 |
| 2013/0254906 | A1* | 9/2013 | Kessler | G06F 21/57 726/34 |
| 2014/0164725 | A1* | 6/2014 | Jang | G06F 21/575 711/163 |
| 2015/0186651 | A1* | 7/2015 | Kim | G06F 21/575 713/2 |
| 2015/0326563 | A1* | 11/2015 | Chan | H04N 21/4367 713/172 |

(Continued)

*Primary Examiner* — Jaweed A Abbaszadeh
*Assistant Examiner* — Hyun Soo Kim
(74) *Attorney, Agent, or Firm* — Patterson + Sheridan, LLP

(57) ABSTRACT

Embodiments provide a mutable CRTM schema for ensuring the integrity of a client workload on a single system as updates are made to the firmware used to initialize and run that system by booting a computing system in a secure mode; when successfully validating a boot image for the computing system via a secure verification code that is blocked from write access when the system is booted in a unsecure mode, allowing write access to the secure verification code; and continuing to boot the computing system in the secure mode according to the boot image. When booting the system and unseccessfully validating the boot image at the third time, the system boot is failed.

17 Claims, 5 Drawing Sheets

(56) References Cited

U.S. PATENT DOCUMENTS

| | | | |
|---|---|---|---|
| 2016/0125187 A1* | 5/2016 | Oxford | H04L 63/123 |
| | | | 713/2 |
| 2017/0195122 A1 | 7/2017 | Obaidi et al. | |
| 2018/0096154 A1 | 4/2018 | Shivanna et al. | |
| 2019/0042754 A1* | 2/2019 | Jreij | H04L 9/083 |
| 2020/0050478 A1* | 2/2020 | Underwood | G06F 9/468 |

* cited by examiner

UNSECURE TO SECURE TRANSITION OF MUTABLE CORE ROOT OF TRUST

BACKGROUND

The present invention relates to the Core Root of Trust, and more specifically, to improvements in the management thereof. In a Core Root of Trust Management (CRTM) schema, a chain of trust begins with the core root of trust. A CRTM schema, when handling a client workload on a server, begins processes by verifying the core root of trust before handling later firmware processes in a boot flow. In some cases, CRTM schemas use an immutable core root of trust, which requires the replacement of the CRTM schema (including verification algorithms and security keys) if a newly discovered bug in the firmware or other boot code is to be fixed or if a newly implemented algorithm is to be provided on the server. In other cases, CRTM schemas use a mutable core root of trust, which allow for updates to the firmware or other boot code, but rely on an external entity to confirm the integrity and application of the updated firmware or boot code.

SUMMARY

According to one embodiment of the present invention, a method for ensuring the integrity of a client workload on a single system as updates are made to the firmware used to initialize and run that system is provided, the method comprising: booting a computing system in a secure mode; successfully validating a boot image for the computing system via a secure verification code that is blocked from write access when the system is booted in a unsecure mode; allowing write access to the secure verification code in response to validating the boot image; and continuing to boot the computing system in the secure mode according to the boot image.

According to one embodiment of the present invention, a system that ensure the integrity of a client workload running thereon as updates are made to the firmware used to initialize and run that system is provided, the system comprising: a microprocessor; a boot Serial Electrically Erasable Programmable Read-Only Memory (SEEPROM) device, including a boot image; a validation SEEPROM device, including instructions for a secure boot engine and a secure verification code, that when exectured by the microprocessor enable the microprocessor to: in response to determining that the system is to be booted in a secure mode, validate the boot image via the secure verification code, in response to successfully validating the boot image, allow write access to a portion of the validation SEEPROM device including the secure verification code, update, by the secure boot engine, the secure verification code according to the validated boot image, and boot, via the secure boot engine, the system in the secure mode according to the validated boot image.

According to one embodiment of the present invention, a computer readable storage medium is provided, which includes instructions that when performed by a processor cause the processor to perform an operation for ensuring the integrity of a client workload on a single system as updates are made to the firmware used to initialize and run that system, the operation comprising: booting a computing system in a secure mode; successfully validating a boot image for the computing system via a secure verification code that is blocked from write access when the computing system is booted in a unsecure mode; allowing write access to the secure verification code in response to validating the boot image; and continuing to boot the computing system in the secure mode according to the boot image.

DETAILED DESCRIPTION

Figure 1:
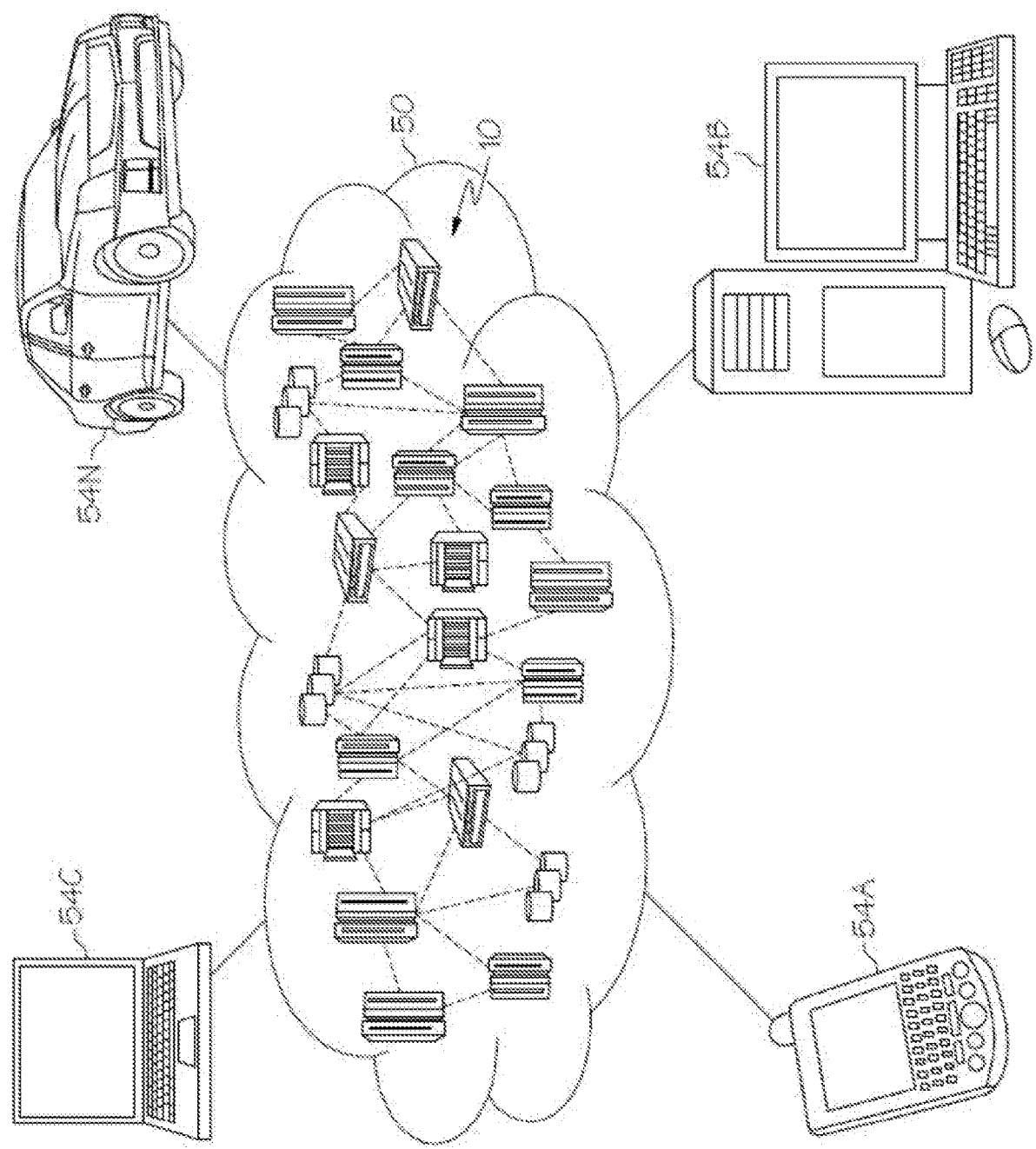
FIG. 1 depicts a cloud computing environment, according to embodiments of the present disclosure.

Embodiments provide a mutable CRTM schema for ensuring the integrity of a client workload on a single system as updates are made to the firmware used to initialize and run that system. By restricting access to modify (e.g., overwrite, replace, update) individual portions of the firmware and boot code, a single system may use a mutable CRTM schema to verify boot images while maintaining a core root of trust. The mutable CRTM schema described herein allows a computing system to transition from an unsecure state to a secure state without relying on a second system to maintain the core root of trust. Additionally, the CRTM schema described herein allows a computing system to propagate updates to itself while in the secure state without relying on a second system or an operator replacing the physical components used in the CRTM schema with known-trusted components (as immutable CRTM schemas do). The present disclosure thus provides improvements to the security of computer systems and improves the functionality of those computing systems to implement updated code or switch between modes of operation for remote clients.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
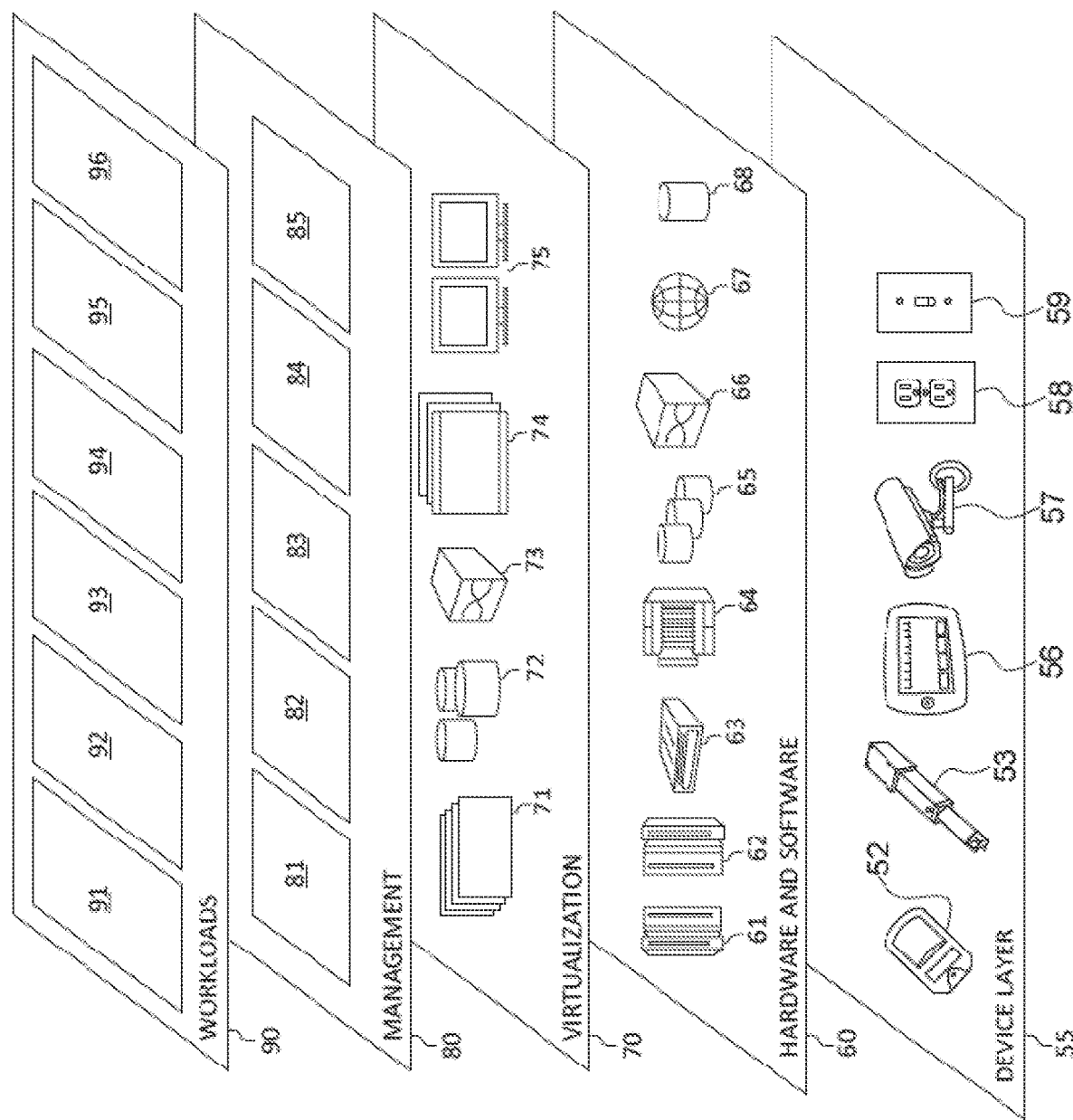
FIG. 2 depicts abstraction model layers, according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

Figure 3:
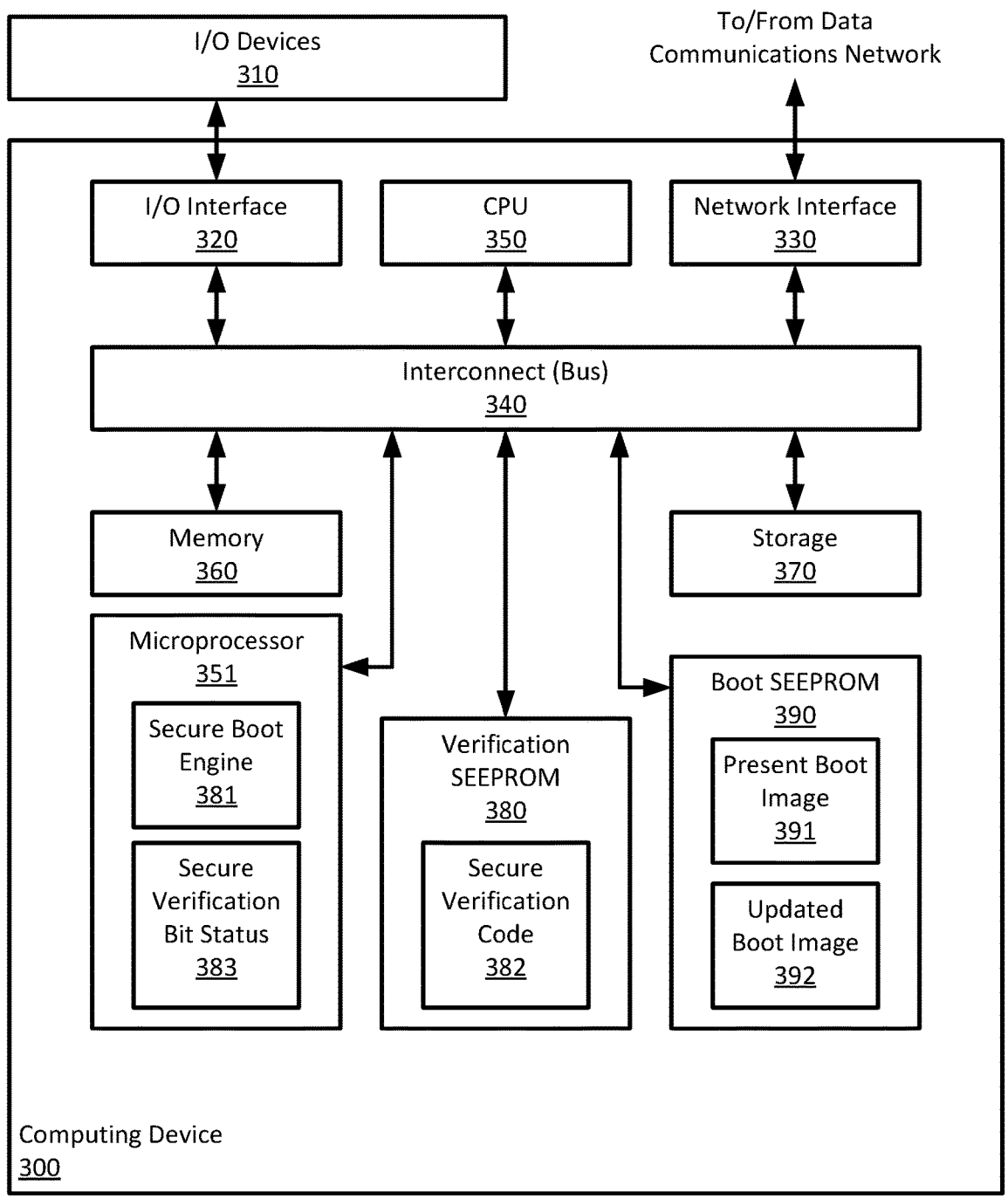
FIG. 3 illustrates a computing system, according to embodiments of the present disclosure.

FIG. 3 illustrates a computing system 300, such as a server 71 providing workloads 90 to various clients. As shown, the computing system 300 includes, without limitation, a central processing unit (CPU) 350, a network interface 330, an interconnect 340, a memory 360, and storage 370. The computing system 300 may also include an I/O device interface 320 connecting I/O devices 310 (e.g., keyboard, display and mouse devices) to the computing system 300.

The CPU 350 retrieves and executes programming instructions stored in the memory 360. Similarly, the CPU 350 stores and retrieves application data residing in the memory 360. The interconnect 340 facilitates transmission, such as of programming instructions and application data, between the CPU 350, I/O device interface 320, storage 370, network interface 340, and memory 360. CPU 350 is included to be representative of a single CPU, a microprocessor, multiple CPUs, a single CPU having multiple processing cores, and the like. And the memory 360 is generally included to be representative of a random access memory. The storage 370 may be a disk drive storage device. Although shown as a single unit, the storage 370 may be a combination of fixed and/or removable storage devices, such as magnetic disk drives, flash drives, removable memory cards or optical storage, network attached storage (NAS), or a storage area-network (SAN). The storage 370 may include both local storage devices and remote storage devices accessible via the network interface 330.

Further, although shown as a single computing system, one of ordinary skill in the art will recognized that the components of the computing system 300 shown in FIG. 3 may be distributed across multiple computing systems connected by a data communications network.

As illustrated, the memory 360 includes a verification Serial Electrically Erasable Programmable Read-Only Memory (SEEPROM) 380 and a boot SEEPROM 390. Although illustrated as separate hardware elements, in some embodiments, the verification SEEPROM 380 and the boot SEEPROM 390 may be implemented in separate memory ranges in a single SEEPROM device. A SEEPROM device uses a serial interface to receive data that is then stored on the physical components (e.g., floating gate transistors corresponding to individual bits) of the SEEPROM device. The contents of the SEEPROM device may be erased and replaced with new content on a bit-wise or byte-wise addressing scheme, and the values of the content may be stored while the SEEPROM device is unpowered.

Similar to the operation of the CPU 350, memory 360, and the storage 370, during boot-up of the computing system 300, a microprocessor 351 accesses and executes instructions stored in the SEEPROM device(s) to initialize firmware for other components of the computing system 300, and eventually hands over control of the boot-up sequence to the CPU 350. In a secure system (or a system that can transition between secure and unsecure modes of operation, as described herein), ensuring that the firmware instructions have not been tampered with during an update (e.g., by a trojan or other virus) is the first step in a CRTM schema, as any changes to the firmware and initial boot instructions may affect how the CPU 350 accesses and performs (potentially malicious) instructions held in the memory 360 or storage 370.

The microprocessor 351 provides a secure boot engine (SBE) 381 that is used to control boot-up the computing system 300 when started (including cold starts and soft restarts), a secure verification code (SVC) 382, that when executed by the microprocessor 351, is used to verify the integrity of boot images for the computing system 300, and a secure verification bit (SVB) status 383. The SVB status 383 is stored on a particular register bit of the microprocessor 351 that is designated as the SVB. The CPU 350 and microprocessor 351 reject requests setting the status of the SVB (to 1 or to 0) unless the address range corresponds to the portion of the verification SEEPROM 380 storing the SVC 382.

The boot SEEPROM 390 stores a present boot image 391 used by the SBE 381 to initialize the computing system 300, and an updated boot image 392 that is queued to patch, update, replace, or otherwise modify the present boot image 391 and affect how the SBE 381 initializes the computing system 300. During system boot-up, the SVC 382 verifies the contents of the boot SEEPROM 390, and allows or disallows the SBE 381 from using the updated boot image 392 based on the SVB status 383 and whether the updated boot image 392 can be verified as including a trusted set of instructions.

In some embodiments, the present boot image 391 is an initial boot image that is stored on a One-Time Programmable memory (a form of read-only memory) that provides a consistent and immutable boot image. In some embodiments, the present boot image 391 may be omitted (e.g., a user removed the present/prior boot image 391 during a prior session), and the boot SEEPROM 390 may include several different boot images 391 for different clients.

Figure 4:
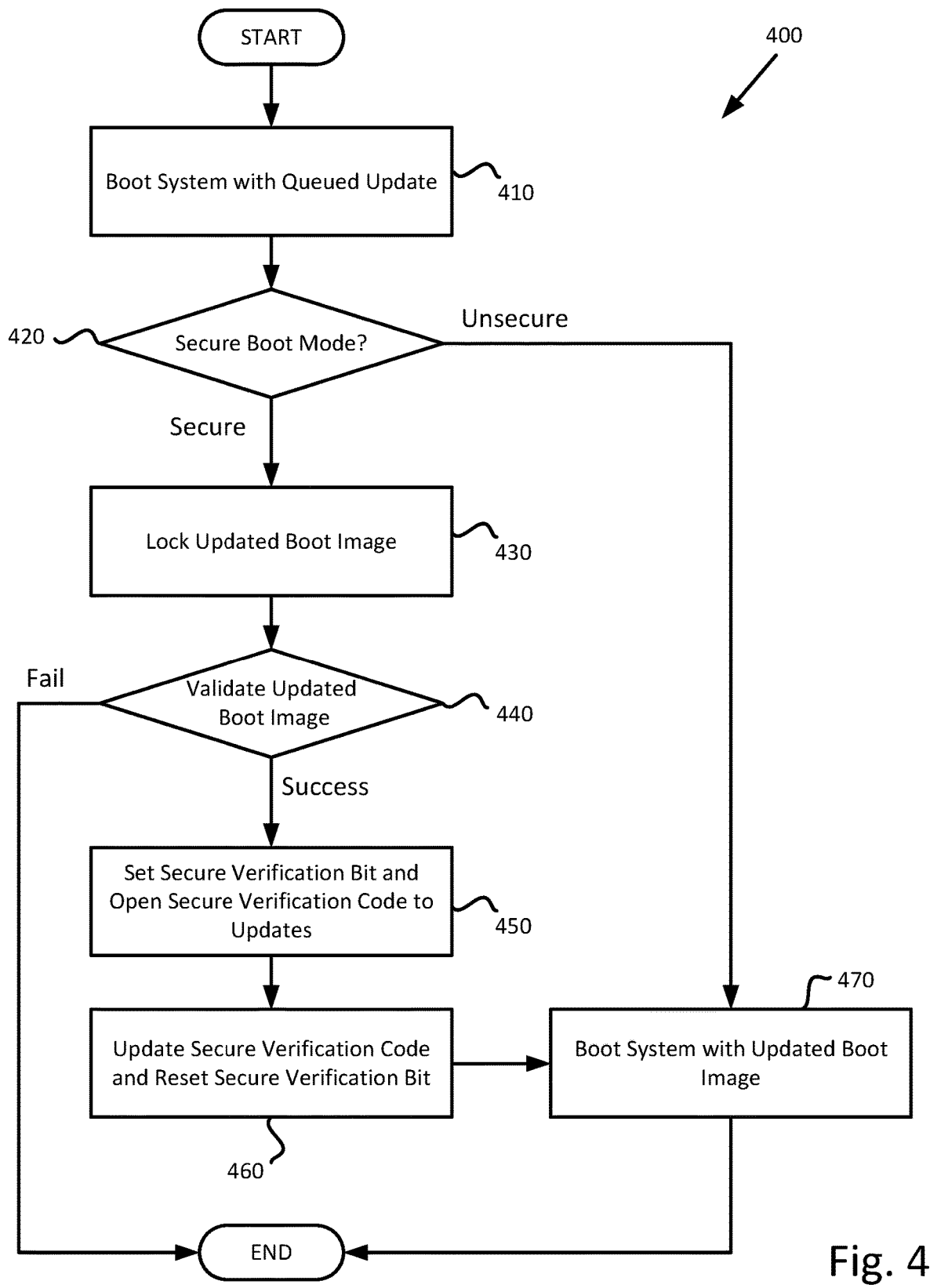
FIG. 4 is a flowchart of a method to ensure that a core root of trust is maintained when updating the firmware of a computing device, according to embodiments of the present disclosure.

FIG. 4 is a flowchart of a method 400 to ensure that a core root of trust is maintained when updating the firmware of a computing system 300. Method 400 begins with block 410, where a computing system is booted with a new or updated boot image 392 (e.g., affecting firmware of the computing system 300) that is queued to update, patch, or replace the initial/present/prior boot image 391. In various embodiments, a user initiates the boot of the system by manually starting a computing system 300 from a shutdown state (i.e., a cold start) or a user or program initiates the boot of the system by re-starting a computing system 300 from an operational state (i.e., a soft start). In various embodiments, the system is booted when a client indicates that the system is to transfer from an unsecure mode of operation, to a secure mode of operation, where operations and software allowed to run on the server conform to a security protocol.

At block 420, a microprocessor 351, (or core of a CPU 350, or similar processing device designated for handling startup activities) determines whether the system is in a secure boot mode. When the system is in an unsecure boot mode, method 400 proceeds to block 470 from block 420. When the system is booted in a secure boot mode, the microprocessor 351/SBE 381 runs the SVC 382 from the verification SEEPROM 380, and method 400 proceeds to block 430 from block 420. When the system is booted in the unsecure mode, the microprocessor 351/SBE 381 does not execute the SVC 382. In some embodiments, the verification SEEPROM 380 is blocked from write and/or read access unless the system is booted in the secure mode.

At block 430, the SBE 381 locks the updated boot image 392 (e.g., by blocking write access to the associated memory address ranges on the boot SEEPROM 390) from being overwritten or otherwise modified.

At block 440, the SBE 381 calls the SVC 382 to validate whether the updated boot image 392 is safe to use on the system. In various embodiments, validation may include various tests of the updated boot image 392 against checksums, hashes of the boot images, known malicious code samples, known safe code samples, etc. When the SVC 382 successfully validates the updated boot image 392, method 400 proceeds to block 450. When the SVC 382 fails to validate the updated boot image 392 (or successfully invalidates the updated boot image 392), the microprocessor 351 terminates system boot, and method 400 may conclude.

At block 450, the SBE 381 sets the SVB from a first state to a second state (e.g., from 0 to 1) to thereby open the SVC 382 to updates from the updated boot image 392. The SVB is not addressable except from the memory address ranges associated with the SVC 382, and the microprocessor 351 may filter out or otherwise reject instructions addressed to the SVB unless the instructions are associated with the predefined memory space associated with the SVC 382. In some embodiments, when an attempt to write to the SVB is received from a memory address other than those associated with the SVC 382, the microprocessor 351 may throw an exception or alert. When the SVB status 383 is in the second state, the verification SEEPROM 380 allows write access to the portion including the SVC 382.

At block 460, the SBE 381 updates the SVC 382 in the verification SEEPROM 380 based on the updated boot image 392 and resets the SVB status 383 from the second state to the first state (e.g., from 1 to 0) to close the SVC 382 from further updates. Method 400 then proceeds to block 470. The SVC 382 is updated after trust in the system's integrity is established (per block 440) so that trust extends through the update of the SVC 382.

At block 470, the SBE 381 continues to boot up the system using the updated boot image 392. Method 400 may then conclude. The microprocessor 351 may transfer further startup activities to the CPU 350 once boot is complete.

Figure 5:
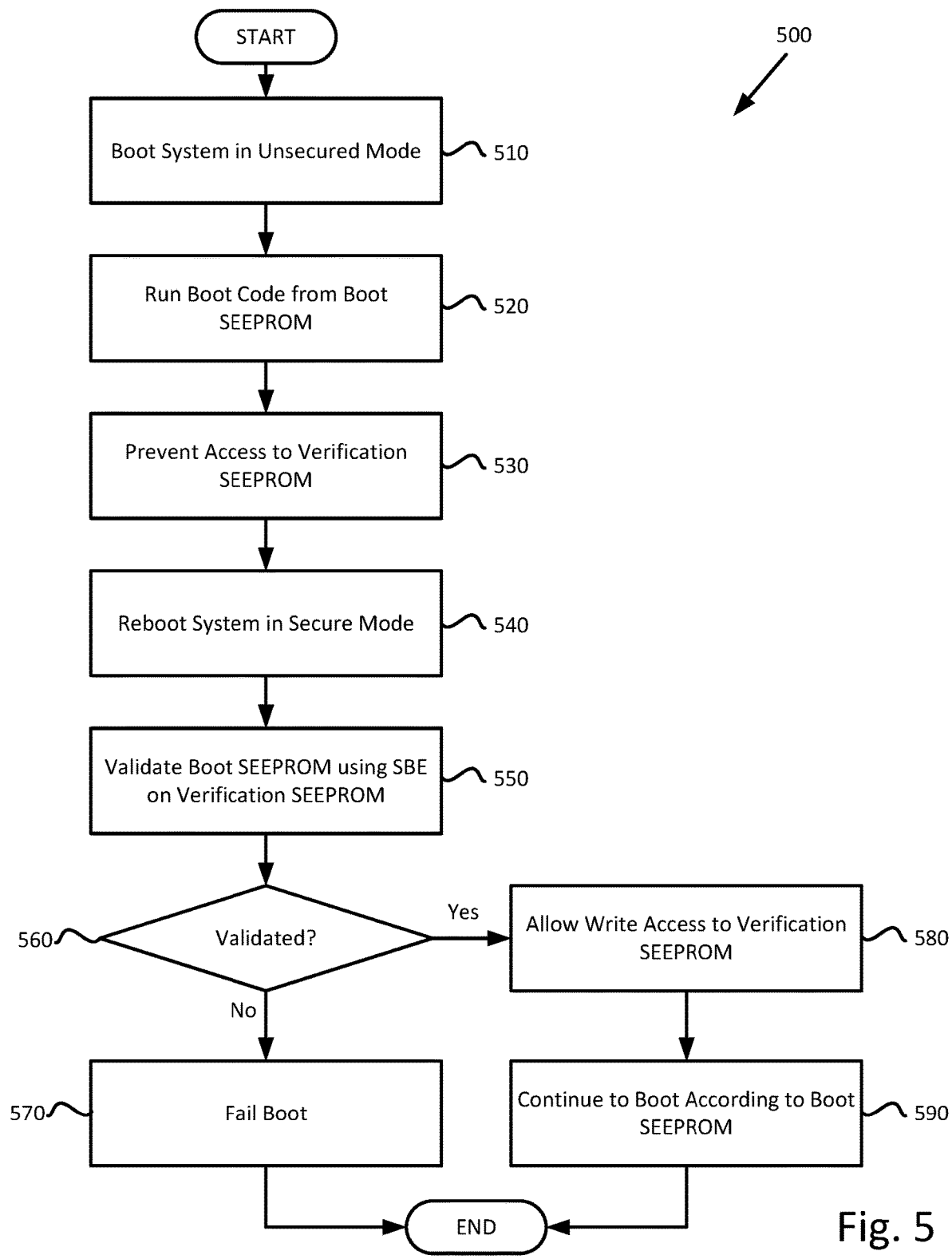
FIG. 5 is a flow chart of a method performing multiple boot sequences for a system in which the system transitions between secure/unsecure modes, according to embodiments of the present disclosure.

FIG. 5 is a flow chart of a method 500 performing multiple boot sequences for a system in which the system transitions between secure/unsecure modes. Method 500 begins with block 510, where the system boots in an unsecure mode. When running in the unsecure mode, the SBE 381 on the system runs boot code from the boot SEEPROM 390 without verifying the content of the boot SEEPROM 390 with the verification SEEPROM 380 (per block 520). The system may run an initial boot image or an updated boot image 392 that has been previously or has not been previously verified as secure. As such, to maintain the core root of trust if the system is to be run in a secure mode, the system prevents write access (and in some embodiments, read access) to the verification SEEPROM 380 (per block 530) when running in the unsecure mode. While in the unsecure mode, the system may run various workloads for various clients until the system is shut down or otherwise signaled to reboot.

At block 540, the system reboots in a secure mode after having previously run in the unsecured mode (per blocks 510-530). When in the secure mode, the system calls the SBE 381 and the SVC 382 from the verification SEEPROM 380 to verify the contents of the boot SEEPROM 390 prior to running the boot image(s) contained therein.

At block 550, the system validates the contents of the boot SEEPROM 390 using the contents of the verification SEEPROM 380. When the boot SEEPROM 390 is unsuccessfully validated at block 560, method 500 proceeds to block 570, where the secure boot-up of the system fails. When the boot fails at block 570, a client may be allowed to reboot the system in an unsecure mode, an alert may be generated for a system administrator, etc. Method 500 may then conclude.

When the boot SEEPROM 390 is successfully validated at block 560, method 500 proceeds to block 580, where the system allows write access to the verification SEEPROM 380. In various embodiments, the system may optionally update the code in the verification SEEPROM 380 (e.g., per method 400) when given write access to the verification SEEPROM 380 and then proceed to block 590 to continue to boot the system in the secure mode according to the validated contents of the boot SEEPROM 390. Method 500 may then conclude.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising: receiving a first boot command to boot a computing system in an unsecure mode according to a first boot image;
   updating the first boot image for the computing system to a second boot image while the computing system is booted in the unsecure mode, wherein the second boot image includes an update to a secure verification code executable used to verify whether boot images are safe to use on the computing system, wherein the secure verification code executable is blocked from write access when the computing system is booted in the unsecure mode:
   receiving a second boot command to boot the computing system in a secure mode, wherein booting the computing system in the secure mode includes:
   locking the second boot image from modification by blocking write access to associated memory addresses for the second boot image while in the secure mode;

executing, by a secure boot engine executed by a processor, the secure verification code executable;
in response to successfully validating the second boot image according to the secure verification code executable:
allowing write access to the secure verification code executable only from memory addresses associated with the secure boot engine;
updating the secure verification code executable according to the second boot image; and continuing to boot the computing system in the secure mode according to the second boot image.

2. The method of claim 1, further comprising:
after booting the computing system in the secure mode according to the second boot image, receiving a third boot command indicating to boot the computing system in the unsecure mode;
booting the computing system a second time in the unsecure mode in response to the third boot command according to the second boot image; and
receiving an updated boot image for the computing system while in the unsecure mode;
after rebooting the computing system in the unsecure mode at the second time, receiving a fourth boot command indicating to boot the computing system in the secure mode according to the updated boot image;
in response to determining from the fourth boot command to boot the computing system in the secure mode, booting the computing system in the secure mode at a third time according to the updated boot image;
validating the updated boot image for the computing system via the secure verification code executable; and
in response to unsuccessfully validating the updated boot image, failing system boot in the secure mode for the computing system.

3. The method of claim 1, wherein the second boot image is stored on a first Serial Electrically Erasable Programmable Read-Only Memory (SEEPROM) device and the secure verification code executable is stored on a second SEEPROM device separate from the first SEEPROM device.

4. The method of claim 3, wherein the secure boot engine is stored in the processor of the computing system, and further comprising:
in response to detecting a second execution of the secure verification code executable not called by the secure boot engine, throwing an instruction storage exception.

5. The method of claim 3, wherein the second SEEPROM device is blocked from write access when the computing system is booted in an unsecure mode.

6. The method of claim 3, further comprising:
in response to successfully validating the second boot image via the secure verification code executable, changing a status of a secure verification bit from a first state to a second state, wherein the secure verification bit is defined on the second SEEPROM device at an address that is addressable by the secure verification code executable, and wherein a portion of the second SEEPROM device including the secure verification code executable is blocked from write access when the secure verification bit is in the first state; and
resetting the secure verification bit from the second state to the first state prior to continuing to boot the computing system in the secure mode.

7. A system, comprising:
a microprocessor;
a boot Serial Electrically Erasable Programmable Read-Only Memory (SEEPROM) device, including a first boot image; and
a validation SEEPROM device, including instructions for a secure boot engine and a secure verification code executable, that when executed by the microprocessor enable the microprocessor to:
receive a first boot command to boot the system using the first boot image in an unsecure mode;
receive a second boot image to update the first boot image, wherein the second boot image includes an update to the secure verification code executable used to verify whether a given boot image is safe to use on the system, and wherein the secure verification code executable is blocked from write access when the system is booted in the unsecure mode;
in response receiving a second boot command that to boot the system in a secure mode according to the second boot image:
locking the second boot image from modification by blocking write access to associated memory addresses for the second boot image while in the secure mode;
executing the secure verification code executable by the microprocessor to evaluate the second boot image, wherein during the secure mode, in response to successfully validating the second boot image, the microprocessor is instructed to:
allow write access to a portion of the validation SEEPROM device including the secure verification code executable,
update, by the secure boot engine, the secure verification code executable according to the validated second boot image, and
boot, via the secure boot engine, the system in the secure mode according to the validated second boot image.

8. The system of claim 7, wherein the validation SEEPROM device, further includes instructions that when executed by the microprocessor enable the microprocessor to:
in response to determining that the system is to be rebooted in the unsecure mode, reboot the system in the unsecure mode according to the second boot image.

9. The system of claim 7, wherein to allow write access to the portion of the validation SEEPROM device including the secure verification code executable, the microprocessor in enabled to:
in response to receiving a command from a predefined memory address space of the validation SEEPROM device where the secure verification code executable is stored, change a secure verification bit on the validation SEEPROM device from a first state to a second state; and
reset the secure verification bit from the second state to the first state after updating the secure verification code executable and prior to continuing to boot the system in the secure mode.

10. The system of claim 7, wherein the system was previously booted in the unsecure mode and the second boot command restarts the system to transition the system from the unsecure mode to the secure mode.

11. The system of claim 7, wherein the validation SEEPROM device, further includes instructions that when executed by the microprocessor enable the microprocessor to:

in response to detecting a second execution of the secure verification code executable not called by the secure boot engine, throw an instruction storage exception.

12. A computer readable storage medium, including instructions that when performed by a processor cause the processor to perform an operation comprising:
   receiving a first boot command to boot a computing system an unsecure mode according to a first boot image;
   updating the first boot image for the computing system to a second boot image while the computing system is booted in the unsecure mode, wherein the second boot image includes an update to a secure verification code executable used to verify whether boot images are safe to use on the computing system, wherein the secure verification code executable is blocked from write access when the computing system is booted in the unsecure mode;
   receiving a second boot command to boot the computing system in a secure mode using the second boot image, wherein booting the computing system in the secure mode includes:
      locking the second boot image from modification by blocking write access to associated memory addresses for the second boot image while in the secure mode:
      executing, by a secure boot engine executed by the processor the secure verification code executable;
      in response to successfully validating the second boot image according to the secure verification code executable:
         allowing write access to the secure verification code executable only from memory addresses associated with the secure boot engine;
         updating the secure verification code executable according to the second boot image; and
      continuing to boot the computing system in the secure mode according to the second boot image.

13. The computer readable storage medium of claim 12, the operation further comprising:
   in response to unsuccessfully validating the second boot image:
      denying write access to the secure verification code executable; and
      failing computing system boot.

14. The computer readable storage medium of claim 12, wherein the second boot image is stored on a first Serial Electrically Erasable Programmable Read-Only Memory (SEEPROM) device and the secure verification code executable is stored on a second SEEPROM device.

15. The computer readable storage medium of claim 14, wherein the secure boot engine is stored on the second SEEPROM device, and further comprising:
   in response to detecting a second execution of the secure verification code executable not called by the secure boot engine, throwing an instruction storage exception.

16. The computer readable storage medium of claim 14, wherein the second SEEPROM device is blocked from write access when the computing system is booted in an unsecure mode.

17. The computer readable storage medium of claim 15, the operation further comprising:
   in response to successfully validating the second boot image via the secure verification code executable:
      changing a status of a secure verification bit from a first state to a second state, wherein the secure verification bit is defined on the second SEEPROM device at an address that is addressable by the secure verification code executable, and wherein a portion of the second SEEPROM device including the secure verification code executable is blocked from write access when the secure verification bit is in the first state; and
   resetting the secure verification bit from the second state to the first state prior to continuing to boot the computing system in the secure mode.

* * * * *